Oct. 31, 1939. K. MAYBACH 2,177,904
FLUID CONTROL MECHANISM FOR A CHANGE SPEED GEAR
TRANSMISSION OPERATED BY FLUID PRESSURE
Filed July 10, 1935 4 Sheets-Sheet 1

Inventor: Karl Maybach

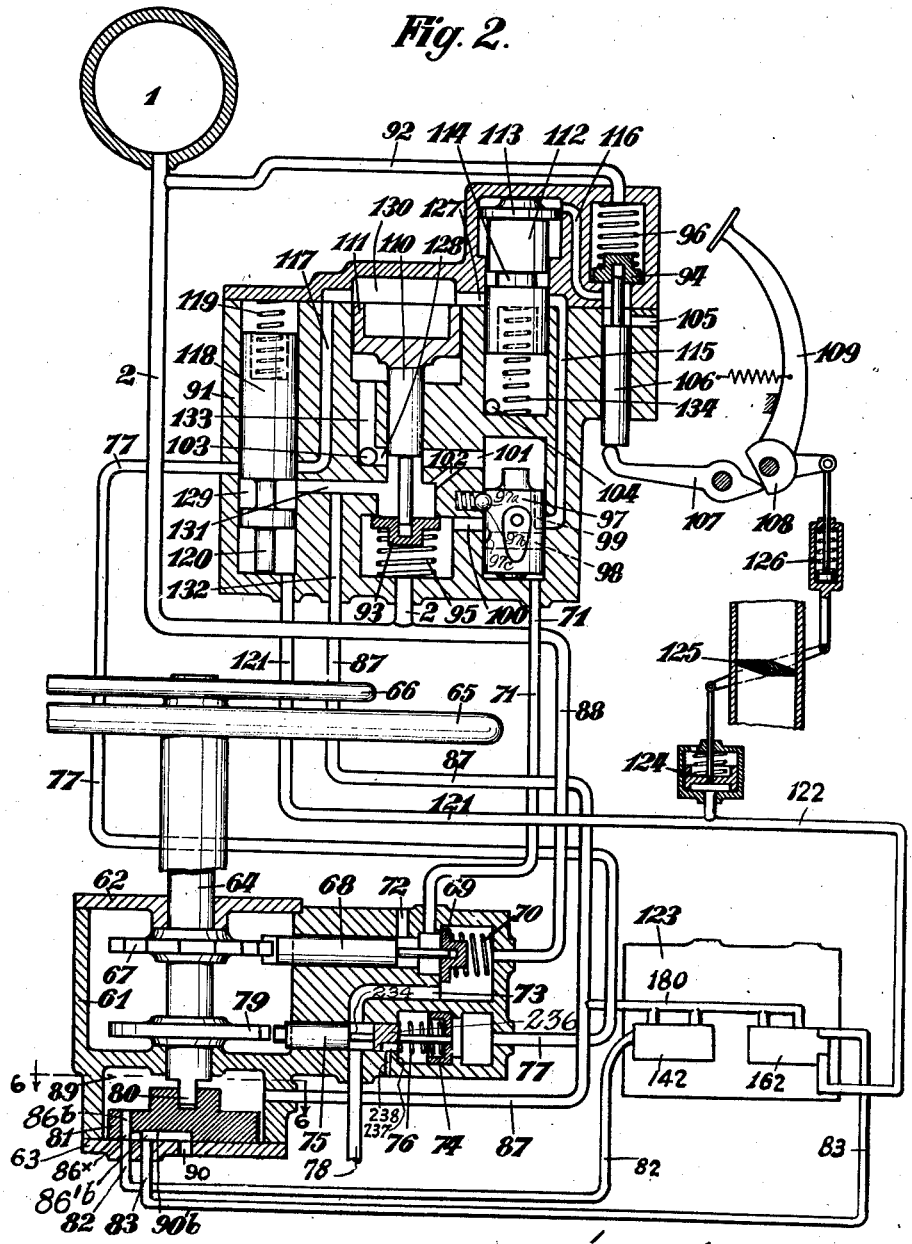

Inventor
Karl Maybach,
Edmund H. Parry Jr
Attorney

Oct. 31, 1939.     K. MAYBACH     2,177,904
FLUID CONTROL MECHANISM FOR A CHANGE SPEED GEAR
TRANSMISSION OPERATED BY FLUID PRESSURE
Filed July 10, 1935     4 Sheets-Sheet 4
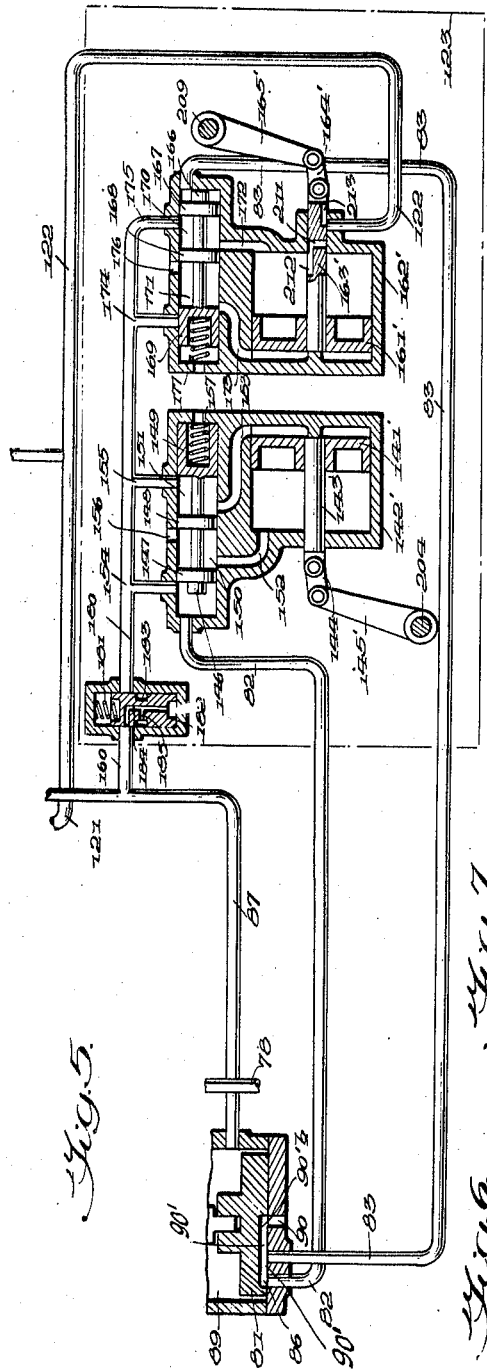
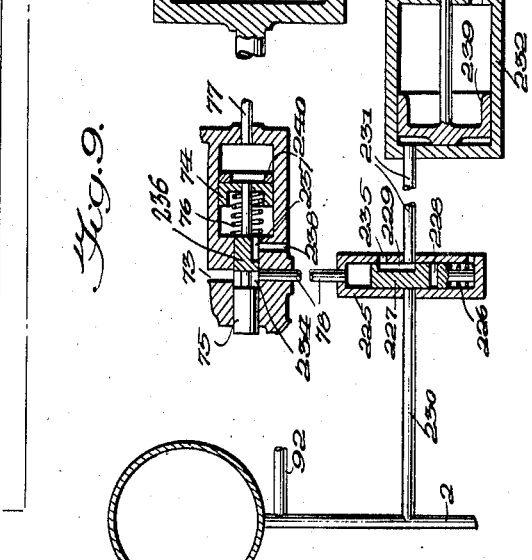
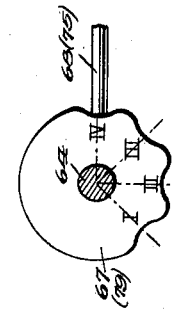
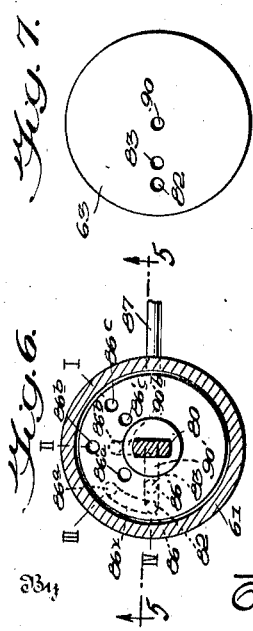
Inventor
Karl Maybach,
Edmund H. Perry Jr
Attorney Patented Oct. 31, 1939

2,177,904

UNITED STATES PATENT OFFICE 2,177,904

FLUID CONTROL MECHANISM FOR A CHANGE SPEED GEAR TRANSMISSION OPERATED BY FLUID PRESSURE

Karl Maybach, Friedrichshafen, Germany, assignor to Maybach-Motorenbau G. m. b. H., Friedrichshafen, Germany Application July 10, 1935, Serial No. 30,758
In Germany August 8, 1934

9 Claims. (Cl. 74—472)

My invention relates to a fluid control mechanism for a change speed gear transmission operated by fluid pressure more particularly of power vehicles with distributer members controlling the admission of the pressure medium to the control cylinders of gear transmissions, the control occurring on cutting off the gas or admitting gas, or in both cases. The device is to be worked chiefly by pressure medium, preferably pressure gas with over-pressure or under-pressure. My new fluid control mechanism is supposed to be added to change speed gear transmissions operated by fluid pressure in a well-known manner, as for example disclosed in the French Patent No. 373,510 and in my U. S. Patent No. 1,883,743, or in my co-pending U. S. application Serial Number 30,760.

According to my invention it is essential that the admission of the pressure medium to the control pistons should not occur exclusively, for instance, in dependence on the movement of the gas lever, but that the admission of the pressure medium to the control pistons be also controlled in dependence on a movement occurring for selecting the speed. Therefore, as soon as the setting of a pressure medium distributer to the position corresponding to the desired speed is effected, a further control member is simultaneously so set that the admission of the pressure medium to the distributer members is released in accordance with the selected speed.

This construction according to my invention has the advantage that the control passages and the spaces of the control cylinders are supplied with pressure medium only if a speed has been previously selected. If no speed has been previously selected, then on the contrary no pressure medium will be supplied to the control passages and the spaces of the control cylinders, on cutting off the gas or on admitting the gas, so that pressure medium losses during the numerous working periods are avoided on cutting off the gas and admitting the gas.

The construction is according to my invention preferably such that the particular control member set on selecting the speed, is moved by the pressure of a pressure medium released in dependence on the selecting movement. The return movement of this control member is preferably effected by the pressure of the pressure medium employed for the control movements of the speeds. As soon as this is acting on the control pistons and consequently the control is more or less complete, the control member dependent upon the selection of the speed will also be returned to its initial position.

The control device with device controlling the pressure medium according to the invention is particularly suitable for such gears in which disengagement of the main clutch between the driving motor and the change gear is no longer required, for instance, gears with synchronizing devices or overrunning clutches, for instance, claw clutches which are alternately controlled and the claw end faces of which are so inclined that on moving the claw halves to be engaged towards each other, these claw halves are repelled one by the other until the originally more rapid clutch half commences to be the slower one, and vice versa.

In the drawings are shown two constructional examples of the invention diagrammatically in section:

Fig. 1 showing a control device with mechanical operation of the distributer members and the control member dependent upon the selection movement;

Fig. 2 a control device in which the distributer members and the control member dependent upon the selection movement are moved by pressure medium;

Fig. 5 is a diagrammatic view illustrating the gear shifting motors and the connection thereof with the distributor valve for the embodiment of Fig. 2 as used with a transmission such as shown in Fig. 4;

Fig. 6 is a view taken on the line 6—6 of Fig. 2 showing the details of the distributor valve;

Fig. 7 shows the fixed plate coacting with the distributor valve;

Fig. 8 shows the construction of the selector cams in the embodiment of Fig. 2; and, Fig. 9 is a diagrammatic view supplementary to Fig. 2 and showing the connection between conduit 78 and the operating motor of the main clutch.

Figure 1:
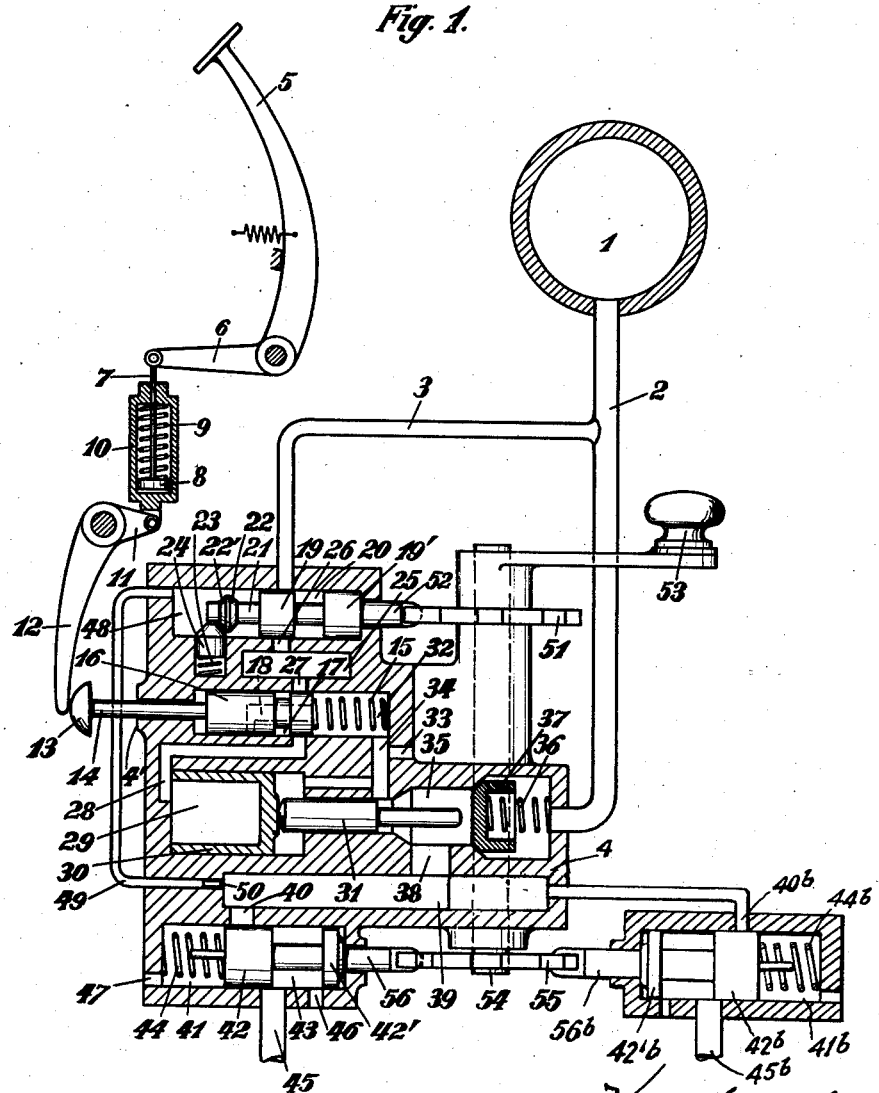

From a pressure medium container 1 lead two conduits 2 and 3 to a casing 4. A gas pedal lever 5 is connected with the lever 6 to which latter is pivoted the rod 7 of a piston disc 8. The piston disc 8 is loaded by a spring 9 and movably mounted in a spring casing 10. The spring casing 10 is pivotally connected with the elbow arm 11 of a lever 12. The lever arm 12 bears upon the stud 13 of a pin 14 of a valve 16 loaded by a spring 15. The movement of the pin 14 and therefore that of the valve 16 is limited by a stop 4' upon the casing 4. The valve 16 has a groove 17 as well as an angular passage 18.

In the casing 4 is provided a further valve 19, 19' which possesses a groove 20 as well as a face pin 21 against the shoulders 22 or 22' of which latter bears a locking pin 24 acted upon by a spring 23, which pin locks the valve 19, 19' either in its right or in its left hand position. In the casing 4 there is moreover provided a space 25 into which open two through passages 26 and 27. A passage 28 leads to a space 29 in the rear of a piston 30 against which bears a draw pusher 31.

The space 32 is connected with the passage 34 and the latter with the air communication opening 33, and the passage 34 is moreover connected with a space 35 in front of one opening of which there lies a stop valve 37 loaded by the pressure of a spring 36, a passage 38 moreover branching off from said space to a space 39. Into the space 39 moreover opens a passage 40. In space 41 slides a control valve 42, 42' which has a groove 43 and is loaded by a spring 44, such valve being one of a series of fluid pressure distributor valves which are selectively operated to effect operation of the gear shifting motors as hereafter explained in connection with Fig. 3. Within reach of the groove 43 of the control valve opens a conduit 45 leading to one of the gear shifting motors and within the reach of movement of the control valve piston 42' is provided in the casing 4 an air communication opening 46. A further opening 47 puts the spring space 41 in front of the control valve 42 into communication with the air. The space 48 in front of the left hand end face of the control valve 19 is moreover connected with the lower space 39 in casing 4 by a conduit 49 which has a throttle valve 50 close to space 39.

With the piston piece 19' of the valve 19 is moreover connected a pusher 52 bearing against a cam disc 51. The cam disc 51 is moved by a hand lever 53 upon the shaft 54 on which is fixedly mounted at the lower end a second cam disc 55. The second cam disc 55 moves a pusher 56 provided upon the slide valve 42, 42'.

Figure 3:
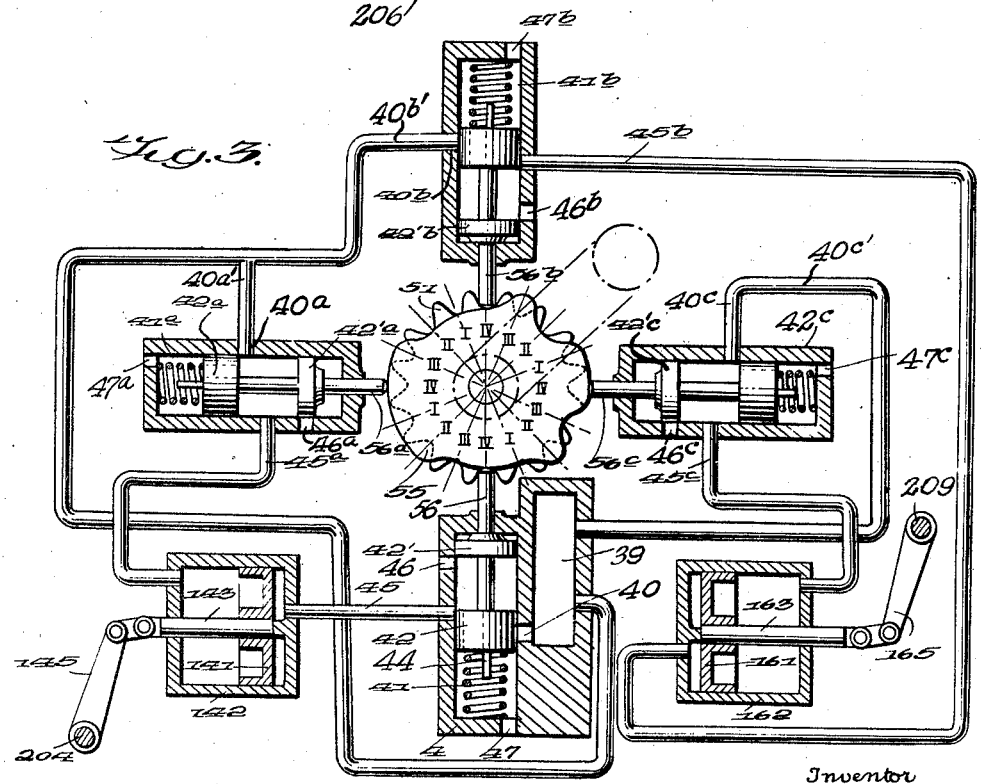
Fig. 3 is a diagrammatic view showing an arrangement of the distributor members and gear shifting motors used in the embodiment of Fig. 1 for a transmission such as shown in Fig. 4.

The number of control valves such as 42, 42' in Fig. 1 will be determined by the number of gear shifting fluid motors to which the pressure medium is to be distributed, and the number of such motors will vary in accordance with the number of different speed selections and/or the type of the transmission used. In Fig. 3 is shown an arrangement of two pairs of control valves, each pair distributing fluid to one of two gear shifting motors which provide the different gear selections in a four speed transmission such as the illustrative one shown in Fig. 4, and hereafter to be described.

The control valve 42, 42' is as shown in Fig. 1, and serving through fluid conduit 45 to supply pressure to one side of piston 141 of the gear shifting motor 142. A similar control valve 42a, 42'a connecting with the space 39 through conduit 40a' and port 40a supplies pressure to the opposite side of piston 141 through conduit 45a.

The second control valve 42b, 42'b shown in Fig. 3 supplies pressure through conduit 45b to one side of the piston 161 of the second gear shifting motor 162. Paired with such valve is a similar control valve 42c, 42'c which supplies pressure through conduit 45c to the other side of piston 161. The intake ports 40b and 40c of the two last mentioned valves are supplied with pressure from chamber 39 through connecting conduits 40b' and 40c'.

The selector cam disc 55 is rotated through its handle 53 to open and close the various control valves so that when fluid pressure is available in space 39 (Fig. 1) it may be distributed to the proper side of the respective gear shifting motors to produce the desired gear selection. The corresponding portions of the cam for the setting of all of the control valves for each gear selection is indicated in Fig. 2.

Figure 4:
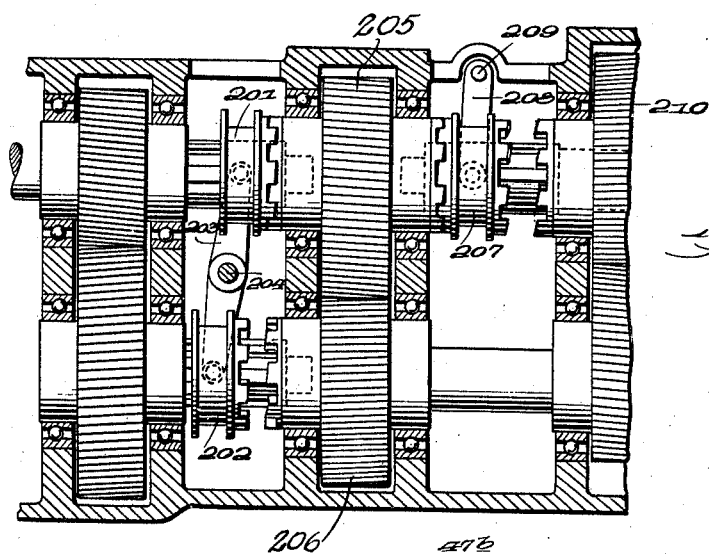
Fig. 4 is a longitudinal elevation of a four speed transmission of the type employing claw clutches in obtaining the different gear selections.

Before further explaining the operation of the mechanism just described, reference is made to the illustrative four speed transmission shown in Fig. 4 provided with overrunning clutches, as in the case of Maybach Patent No. 2,030,752. Therein, the shift lever 203 serves to alternately engage clutches 201 and 202. Such shift lever is carried on shaft 204. Motor 142 of Fig. 3 will serve to operate the clutches, rod 143 of piston 141 being connected through arm 145 with shaft 204. On movement of the piston 141 from its right to its left position the teeth of clutch 201 can be disconnected from the clutch teeth provided at the left of gear 205, and at the same time clutch 202 can be engaged with clutch teeth provided at the left of gear 206.

Shift lever 208 of the double claw clutch 207 is mounted on shaft 209, and is operated by motor 162 through connection of piston 161 through rod 163 and arm 165 with shaft 209. On moving the piston 161 from its left to its right position the double claw clutch is disengaged from the clutch teeth provided at the right of gear 205, and engaged with the clutch teeth at the left of gear 210.

In the fourth speed position of the transmission, as represented by the position of the control valves in Fig. 3, the cam 55 is in position to hold open control valve 42a, 42'a so that pressure is supplied to the left side of piston 141. At such time valve 42, 42' closes port 40 and the right side of piston 141 is opened to the atmosphere, through conduit 45 and port 46. Also under the same conditions, valve 42c, 42'c permits the flow of fluid from chamber 39 through conduit 40c' and port 40c through conduit 45c to the right side of piston 161 of the second motor 162. The other side of piston 161 is vented through conduit 45b and opening 46b due to the position of valve 42b, 42'b.

In shifting from fourth speed to third, for example, the control lever 53, and therewith cam disc 55 is rotated one subdivision. The positions of valve 42, 42', and valves 42a, 42'a remain unchanged. Piston 141, and accordingly clutches 201 and 202 are therefore not moved. However, control valve 42b, 42'b, is opened through rotation of the cam from fourth to third speed position, and valve 42c, 42'c, shifts to the left. Pressure is thus supplied to the left side of piston 162 through conduit 45b while the other side of the piston is opened to the atmosphere through line 45c and port 47c. Piston 161 therefore shifts to the right and claw clutch 207 of the transmission is similarly shifted to effect the proper change in gear selection.

It will be evident that the arrangement of the control valves and operating motors is such that any gear selection may be obtained by rotation of the cam 55 from any previous set position.

The supply of pressure to space 39, from whence the same is distributed through the various control valves in the manner and for the purpose just explained is dependent upon the operation of the inventive structure as shown in Fig. 1, and the latter will now be considered.

When the driver during drive turns the hand lever 53, the pusher 52 and therewith also the valve 19, 19' are moved to the left by the cam disc 51 and the slide valve is held by the locking pin 24 in its left hand end position. In this left hand position of the valve, a communication is established, via groove 20, between the pressure medium container 1 via conduits 2, 3 and passage 26 with the upper space 25 in casing 4. Be it now assumed that during this turning of the hand lever 53 (selecting motion), the driver still has his foot resting upon the gas lever 5, and that therefore the latter stands in any position corresponding to a certain opening of the carburetter.

The lever 12 would then be in its right hand end position so that the knob 13 of the pin 14 would rest against stop 4' of the casing, and the valve 16 connected with the pin 14 would also be in its right hand end position, in which the passage 28 is connected via angular channel 18 with the space 32 on the right of valve 16 and consequently via passage 34 with the air communication opening 33. By this means the space 29 behind the piston sleeve 30 is in communication with the air.

During the rotation of the shaft 54 effected by turning the hand lever 53, the cam disc 55 rotates to the same extent as the cam disc 51 and the respective valves 42, 42a, 42b and 42c are selectively opened or closed in the manner heretofore explained.

If now the driver returns the gas lever 5 to the rest position, the valve 16 is displaced under pressure of the spring 15 into the left hand end position shown in Fig. 1. During this movement of valve 16 the passages 27 and 28 are for a short moment in connection by means of the groove 17 of the valve 16 and pressure air can pass from the conduit 3 via groove 20 in valve 19, 19', the passage 26, the space 25, the passage 27, the groove 17 in valve 16 and the passage 28 to space 29. By this means, the piston sleeve 30 is displaced to the right, and the valve 37 is opened by the draw-pusher 31 in opposition to the spring 36.

Simultaneously, the lower opening of the passage 34 is closed by the draw-pusher 31, and the spaces 35 and 39 are thereby separated from air communication opening 33. Now, pressure air can pass from the conduit 2 through the opened valve 37, the passage 38, the space 39, one of the ports 40, 40a, 40b, 40c and the groove in the particular control valves which are open, through the particular conduits 45, 45a, 45b, 45c, which are opened thereby to the proper sides of the pistons of the respective gear shifting motors for the desired speed. This speed will therefore be put in after the return of the gas lever to rest position.

The pressure used for the control passes from the space 39 via throttling point 50 and conduit 49 to the space 48 and presses in the latter the valve 19, 19' standing in its left hand end position back into its right hand end position, sliding also back the locking bolt 24, in which position the slide again closes admission of pressure air from the passage 3, the movement of pusher 52 to the right being possible because of the cam disc 51, by known means being caused to turn over at least one breadth of a cam so that there is always a gap between two cams standing opposite to pusher 52 allowing for its movement to the right.

On gas being admitted by depression of the pedal lever 5 by the driver, the valve 16 is shifted to the right so far that the knob 13 of the pin 14 bears upon stop 4' and the valve 16 is again displaced into its right hand end position in which it connects as already above described, the space 29 with the outer air. The valve 37 closes under the action of spring 36, the draw-pusher 31, receding before the valve 37, renders free the lower opening of the passage 34, and the piston 30 returns again into the left hand end position shown in Fig. 1. By the release of the lower opening of passage 34, the control cylinder acted upon by pressure air, is connected via the corresponding one of the conduits 45, 45a, 45b, 45c with the outer air via the following path: the corresponding one of the ports 40, 40a, 40b, 40c, space 39, passage 38, space 35, passage 34, air communication opening 33. During further admission of gas by the driver, the spring 9 is suitably tensioned by the piston disc 8 moving with the gas lever 5, 6. During the movement of the valve 16 from its left hand into its right hand end position, the passages 27 and 28 are connected together by the groove 17 of the valve 16, but the pressure air admission to the space 29 is not effected thereby, as the valve 19, 19' has not admitted further pressure air to the space 25.

If the selection of the speed occurs during rest position of the gas pedal lever, the operations during selection and setting will take place in exactly the same manner as above described. During admission of the gas, pressure air is admitted to the space 29 and the valve 37 is thereby opened, owing to the passage connections 27, 28 being slid over by the groove 17 of the valve 16.

The passage 18 may be entirely omitted and communication of the space 29 with air may be effected by existing leakages without otherwise changing the construction as shown in Fig. 1.

On cutting off the gas supply, if no speed has previously been selected, the control valve 16 will perform the described movement from its right hand into its left hand end position; as however the valve 19, 19' prevents admission of pressure air from the conduit 3, neither the spaces and passages leading to the space 29, nor the conduits and passages communicating with the control cylinders, nor the control cylinders themselves, are supplied with pressure air.

Therefore, during normal cutting off of the gas, no pressure air losses of any kind will occur, this being for the same reason also the case during the admission of gas and in the rest position of the gas lever 5.

In the constructional example according to Fig. 2, 61 is the casing of the speed selector, which is closed at its upper and lower ends by the covers 62 and 63. Upon the shaft 64 of the speed selector which is set by a small hand wheel 66, which may be located above the steering wheel 65 or at any other point accessible to the driver, is mounted a cam disc 67 as shown in Figure 8 which moves a slide pin 68. 69 is a stop valve, loaded by a spring 70, for the pressure air admitted from the branch conduit 88 connected to the conduit 2. 71 is a conduit connected behind the valve 69, 72 is an air communication opening. 73 is an angular passage which passes pressure air admitted from the conduit 88 to the slide pin 75 connected wtih the piston 74, which is under the action of the spring 76. 77 is a connection conduit leading to the casing 91 containing the control parts. The conduit 78 leads to the operating device of the clutch as shown in Figure 9 hereafter to be described. The slide pin 75 is moved by the cam disc 79 as shown in Figure 8. With the shaft 64 of the speed selector is connected by a pin 80 the distributer disc 81 which turns over a plate 63 to which latter are connected the conduits 82 and 83 leading to the control cylinders of the gear. In the distributor disc 81 is a series of ports 86, 86a, 86b and 86c adapted to be selectively brought into registry with conduit 82 upon rotation of disc 81. A corresponding set of ports 86', 86'a, 86'b and 86'c are also disposed in the disc to register with conduit 83. 89 is the space above the distributor disc 81 to which air is supplied from conduit 87. Located in plate 63 is an air vent 90 registering with certain passages 90' and 90'b in disc 81 as will be clear from Figures 2 and 6. In Fig. 2 the disc 81 is set for second speed position, and in Fig. 6 and the corresponding view, Fig. 5, it is set to fourth speed position.

The arrangement of ports and grooves in disc 81, as just referred to, is particularly intended for use with a 4-speed transmission such as shown in Figure 4, and wherewith two gear shifting motors are employed. Referring particularly to Figure 5 for the first speed ports 86c and 86'c are both in registry with the respective conduits 82 and 83 so that pressure is simultaneously supplied to such conduits from space 89 which connects with supply pipe 87. In the second speed position which is shown in Fig. 2 port 86b registers with conduit 82 to supply pressure thereto, but port 86'b, which does not extend completely through disc 81, communicates through passage 90'b with opening 90 so that conduit 83 is vented to the atmosphere through the latter. In the third speed position port 86a registers with conduit 82 and vents such conduit to the atmosphere. It will be observed that ports 86a and 86 neither extend completely through the disc, but are interconnected by passage 86x. Port 86 communicates through passage 90' with opening 90 in plate 63. Hence, when port 86a registers with conduit 82 pressure will be exhausted from the conduit through port 86a, passage 86x, passage 90' and opening 90. Correspondingly, in the third speed position, pressure will be supplied from space 89 to conduit 83 through port 86'a. In the fourth speed position, as represented in Figures 5 and 6, the pressure in both conduits 82 and 83 will be vented to the atmosphere through ports 86 and 86' which are interconnected with each other and put in communication with opening 90 through passage 90'.

To the lower portion of the casing 91 is connected the conduit 2, to the upper part the conduit 92 branched off the conduit 2. 93 and 94 are pressure air valves which are loaded by the springs 95 and 96. 97 is a slide valve corresponding to the control valve 19 of Fig. 1, which is held in a similar manner as shown in Fig. 1, in its two end positions by suitable locking means, such for example as a spring-pressed ball or finger 97a coacting with recesses 97b and 97c in valve 97, and which possesses a cross passage 98 as well as a groove 99. Under the slide valve 97 opens the conduit 71 coming from the speed selector.

To the space under the valve 93 is connected a passage 100 which opens at the slide valve 97. 101 and 102 are passages in the casing 91. 103, 104 and 105 are bores which establish communication with the outer air. The valve 94 is moved by the pin 106 which can be lifted by the lever 107 by means of the cam 108 by the gas lever 109. The valve 93 is moved by the pin 110 which is in connection with the piston 111. Via passage 133, the space under the piston 111 is in communication with the bore 103 leading to the exterior, to which is connected the passage 128. Into the space 130 above the piston 111 opens a communication passage 127 which leads to the slide valve 112. The latter possesses at its upper end a disc-shaped projection 113 and moreover a groove 114. From below, the slide valve 112 is loaded by the spring 134. The two slide valves 97 and 112 are in connection via passage 115. The space provided above disc 113 of the slide valve 112, is in communication via passage 116 with the guide bore of the slide valve 106.

From the space above the piston 111 leads a passage 117 to a further slide valve 118 which latter is loaded at its upper end by a spring 119 and has a groove 129 and has at its lower end an extension pin 120. 131 is a connection passage to passage 132 to which latter is connected conduit 87. Into the space under the slide valve 118 leads a conduit 121 which is connected to a conduit 122 which latter is in connection with the control cylinders 142' and 162' for operating the change gear 123 as shown diagrammatically in Figure 2 and in detail in Figure 5. Conduit 122 also leads to the cylinder 124 of an auxiliary device for moving the throttle valve 125 for purposes hereafter mentioned. Into the linkage which starts from the gas lever, for moving the throttle valve, is built a spring device 126.

As heretofore mentioned, the particular construction of control disc 81 and the arrangement of conduits 82 and 83 is intended to function with a four speed transmission, such as shown in Figure 4, already discussed in connection with the embodiment of the invention in Figure 1. Two control cylinders are again used, and the latter may be arranged as shown in Figure 4. Therein, 141' and 161' are pistons of two compressed air motors 142' and 162', the piston rods 143' and 163' of which are moved by means of links 144 and 164, and levers 145' and 165'. Such levers are respectively connected to shafts 204 and 209 of the transmission of Figure 4 to actuate claw clutches 201, 202 and 207. In a side chamber of motor 142' is a slide valve 146 having a groove 150 formed between opposing portions 147 and 148, and a second groove 151 between portion 148 and 149. Spring 157 normally holds valve 146 in its left end position. The second motor 162' has a similarly arranged slide valve 166 with portions 167, 168 and 169, grooves 170 and 171, and spring 177. In the respective motors 142' and 162', passages 152 and 153, and 172 and 173, connect the spaces of the slide valves with the cylinder spaces lying in front and in the rear of the pistons 141' and 161'. To the casing portions of the cylinders which contain the slide valves are connected on the one hand conduits 82 and 83, which come from the speed selector mechanism, and on the other hand the conduit branches 154 and 155, and 174 and 175, which latter branch from a common conduit 180. Between conduit 160, coming from conduit 87 and the conduit 180 is interposed a slide valve 182 loaded by a spring 181, which has a groove 183 and an angular channel 184, the latter communicating with groove 183 through a small cross passage 185. 156 and 176 are air communication openings in the casings of the motors.

When air pressure is admitted to the casing of slide valve 146 in motor 142 from conduit 82, such valve is displaced into its right end position in opposition to the force of spring 157. If, at the same time conduit 83 is vented to the atmosphere through opening 90 in plate 63, no pressure is admitted to slide valve 166 of motor 162'. Valve 166 therefore remains in its right end position under the force of spring 177.

By means of conduit 160, which connects with conduit 87, air pressure passes to the slide valve 182 through an angular passage 184 into the space under such valve, which is then displaced in opposition to spring 181 into its upper position. Passage 184 is so dimensioned that the movement of slide 182 upwardly is retarded relative to the control movement of slide valve 146. With slide valve 182 in its upper position air pressure from conduit 160 passes through the annular space 183 to conduit 180. The pressure simultaneously passes as before under valve 182 through passage 185 so that slide valve 182 is held in its upper position. From conduit 180 the pressure passes into branches 154 and 174, assisting in holding slide valve 146 in its right end position while at slide valve 166 further passage is closed by the end portion 169. Also, through passages 155 and 175 air pressure passes from conduit 180 through groove 151 of slide valve 146 and passage 153 to the space on the right of piston 141', and also, in motor 162', pressure passes through groove 170 of slide valve 166 and passage 172 into the space on the right of piston 161'. Piston 141' is displaced by the action of the air pressure into its left end position and the previous engagement of the clutch is changed. Piston 161' is held by air pressure in its assumed left end position.

The shifting of piston 141' from its right to its left position, and/or the shifting of piston 161' from its left to its right position will be readily understood. It will be noted in this connection that the air for actuating the pistons is supplied from conduit 180 to either side of the pistons selectively through slide valves 146 and 166. Such slide valves are controlled through passages 82 and 83 by the admittance of pressure to or the venting of conduits 82 and 83 through the selector mechanism of the invention.

The piston 124, previously referred to, is an auxiliary mechanism acting on gas throttle valve 125, and is intended to be employed in transmissions as shown in Figure 4 having claw clutches so that during the repelling periods of the claws, one clutch half may be retarded or accelerated to bring the same as rapidly as possible to the speed of the other clutch half, and thus hasten clutching engagement between the two. As soon as the repelling period terminates, and the required gear selection is obtained by clutch engagement, the control of the pressure medium admitted to the motors may be reversed.

The pressure in line 122 acting on piston 124 (Fig. 2) is controlled in the present instance through apparatus incorporated in gear shifting motor 162' as shown in Figure 5. In piston rod 163' is a bore 211 and connecting longitudinal groove 212, and a second longitudinal groove 213. When pressure is supplied from line 180 to the right hand side of piston 161' and such piston has been moved sufficiently far to the left to bring one clutch half in the transmission into preliminary rattling engagement with a preceding clutch half, line 122 is connected with the chamber on the right of piston 161 through bore 211 and groove 212. Pressure is accordingly supplied from the piston chamber to line 122 to act on piston 124 of the throttle valve motor, and to the adjoining line 121 to effect raising of slide valve 118, all of which will be clear from a joint consideration of Figs. 2 and 5. Through the raising of slide valve 118, pressure is supplied from passage 131 through groove 129 of valve 118 to conduit 77 to move piston 74 of pin 75 to the left, and also to passage 117 which opens into chamber 130 above piston 111. At the same time, through movement of piston 124 under pressure supplied through 122, throttle valve 125 is opened to a certain extent to speed up the motor and increase the rotational rate of the preceding clutch half. This enables the clutch halves to be brought into final clutching engagement for the desired gear selection in the transmission, piston 161 then moving into its left end position. As soon as piston 161 has reached the latter position, lines 121 and 122 are vented to the atmosphere through groove 213 in piston rod 163'. Reduction in pressure in lines 121 and 122 causes slide valve 118 and piston 124 to return to their lower end positions through the action of their springs. Throttle valve 125 is again closed and pressure is cut off from line 77. The shift operation is now completed.

Conduit 78 (Fig. 2), as previously stated, is intended to be connected with the main clutch of the vehicle. An arrangement for this purpose is shown in Figure 9 whereby the pressure is utilized to operate the control motor of the clutch. Therein conduit 78 leads to one end of a housing 225 wherein is a slide valve 227 provided with a transverse bore 228. Conduit 230 connects housing 225 with the pressure supply of the main reservoir. A further conduit 231 under control of valve 227 supplies pressure to piston 239 of the servomotor 232 of the clutch. Valve 226 is urged upwardly by spring 226 and when in raised position provides communication through its bore 228 between conduits 230 and 231. Pressure medium is thus caused to move piston 239 to the right and effect disengagement of the clutch.

When pin 75 is in its right position and pressure is supplied through conduit 78, slide valve 227 is forced downwardly to close conduit 230. At such time pressure previously acting on piston 239 is vented through groove 229 in the valve 227 and port 235 which registers with such groove. The clutch is caused to engage through the usual spring.

During normal operation, that is when not shifting, the pin 75 is held by its spring 76 in the right end position shown on Figures 2 and 9, and pressure from passage 73 passes through groove 234 in pin 75 and through conduit 78 to act on slide valve 227. Slide 227 is thereby moved into its lower end position, in which it connects the passage 231 from servomotor 232 with the de-aerating bore 235 in housing 225 by means of the groove 229. The clutch 233 is connected in through the action of the usual clutch or coupling spring.

During the shifting operation, that is as long as passage 122 (Fig. 2) is filled with pressure medium and slide 118 assumes its upper position under pressure supplied through line 121, piston 74 and therewith pin 75 is moved into its left end position by the pressure medium from passage 131 fed through passage 77, in which end position pin 75 engages in a groove of disc 79 and prevents it from rotation. At the same time, through the part 236 of pin 75 at the right of recess 234, connection between passage 73 and 78 is interrupted. The excess pressure above slide 227 in housing 225 escapes through leak points or over a groove 237 provided in the pin part 236 through a de-aerating bore 238 provided in housing 61. Slide 227 is thereby forced by its spring 226 into its upper end position in which, through its transverse bore 28, it connects the pressure medium feed passage 230 with the passage 231. Piston 239 is moved to the right and the clutch 233 disconnected. After shifting is completed passage 122 is again de-aerated, slide 118 thereby carried into its lower end position upon release of pressure in line 121 and the pressure medium supply 77 to piston 74 cut off, said piston 74 then returning through the action of its spring 76 into its right end position limited by the stop 240. The connection between the passage 73 and the passage 78 is again established, and slide 227 forced into its lower end position, passage 231 therewith connected through the groove 229 with the de-aerating bore 235 and the clutch again connected in.

The mode of operation of the device according to Fig. 2 is the following:

In the drawings the various parts are shown in the position assumed in the rest position of the gas lever. As the pin 106 is in its lower position, valve 94 is closed. The space above the disc 113 is therefore connected via passage 116 and the air communication bore 105 with the outer air, and the slide valve 112 is under the action of the spring 134 in its upper end position.

On turning the hand wheel 66, the valve 69 is opened against the force of the spring 70 by means of the cam disc 67 by the pin 68. Pressure air consequently passes through the conduit 71 under the slide valve 97 which latter is thereby displaced into its upper position and is held in this position by engagement of spring-pressed ball 97a with recess 97b in slide valve.

By the movement of the slide valve 97 into its upper end position, pressure air from the conduit 2 passes into the passage 115 through passage 100 and the bore 98 of the slide valve 97.

By the setting of the distributer disc by the hand wheel 66, those of the conduits 82—85 which are required for setting the selected transmission, were connected by the corresponding control passage 86 with the space 89, and consequently the admission for the pressure air to the corresponding control members of the gear was established.

As soon as the driver now admits gas the bore 105 is closed by the pin 106 and thereby the connection with the outer air is interrupted. Simultaneously valve 94 is lifted so that pressure air passes from the conduit 92 through the passage 116 above the disc 113 of the slide valve 112 and depresses the latter into its lower position. So long as gas is admitted, the slide valve 112 is held in its lower position by the pressure medium passed above the slide valve. During the sliding over of the communication passage 127 during its downward movement, the pressure air contained in the passage 115 passes above the piston 111, presses same downwards, closes thereby by means of the pin 110 the small passage 128 leading to the air communication bore 103, and lifts the valve 93. Pressure air consequently passes through the conduit 87 into the space 89 and from the latter through the passage 86 into the conduits leading to the control cylinders of the change gear. The selected transmission is therefore now set. Simultaneously pressure air passes via the inclined passage 102 and the passage 101 above the slide valve 97, which latter is thereby displaced back into its lower position, in which via longitudinal groove 99 the passage 115 is via passages 101 and 102 again filled with pressure air.

This described arrangement is particularly used with gears with overrunning claw clutches in which the end faces of the claw teeth are so inclined that engagement occurs only upon overrunning of the slower running clutch half by the more rapidly running clutch half (disclosed in my U. S. Patents Reissue 17,707, Nos. 1,949,167 and 1,949,168) and in which auxiliary devices are provided by which during the repelling condition one clutch half is retarded or accelerated, as disclosed for example in my U. S. Patents Nos. 1,891,678 and 1,883,743. With such gears, the conduit 121 is connected to a conduit conveying the controlled pressure medium, of the corresponding auxiliary device; in the illustrated example this is the conduit 122 which leads to the cylinder 124, the piston of which moves the throttle valve 125, the spring device 126 interposed in the normal gas linkage permitting of a movement of the throttle valve, without the normal linkage of the gas pedal 109 being moved at the same time. By the pressure in the conduit 121 coming from the clutch motor cylinder 162 through conduit 122 under control of piston 161 as explained in connection with Fig. 5, the slide valve 118 is displaced upwardly, and by the groove 129 of this slide valve the passage 131 is connected with the passage 117, so that pressure air admitted by the valve 93 can also pass above the piston 111. The valve 93 is therefore held open by the pressure released thereby until the pressure existing in the passage 121 disappears, and the slide valve 118 moves back into its lower position, that is so long as the repelling condition of the engaged claw clutch of the gear lasts. As previously explained, the pressure in conduit 122, and hence in passage 121, after operation of gear shifting motor 162' (Fig. 5) to bring the clutch teeth (Fig. 4) into repelling condition, is changed through groove 213, or through groove 212 and bore 211, in the piston rod 163' of motor 162'.

So long as the slide valve 118 is in its upper position, pressure air also passes through the conduit 77, to the space on the right of the small piston 74 so that the latter is slid against the action of the spring 76 into the recess of the disc 79 lying opposite to the slide pin connected with the piston. This prevents during the proper controlling operation, a new selecting movement being carried out by which obstructions might occur.

A particular advantage as regards safety, results, in the described arrangement, from the fact that at any setting of the control all the control slides are set by the pressure means, so far as the same are not already held in the required position by spring force, and that the pressure medium is passed to all the control pistons, that is, unless the latter are already, due to a previous setting, in the correct position for the speed to be set, in which case they are not displaced by the action of the pressure medium, but only held in their previous positions.

While in the several embodiments herein illustrated and described pressure above atmospheric is employed, the basic features of the invention are not to be taken as limited in this respect, since suction and pressure are commonly employed interchangeably in the art in which the present control mechanism falls.

I do not want to be limited to the details described or represented in the drawings as many variations will occur to those skilled in the art.

What I claim is:

1. A control device for pressure-operated gear shifting mechanism in motor vehicles comprising a series of distributor valves controlling the distribution of pressure to the gear shifting mechanism for various selections, means for selectively setting said distributor valves for various gear selections, a source of fluid pressure, a valve controlling the supply of pressure from the source to the distributor valves, and pressure controlled actuating means for opening and closing said supply control valve including a second valve controlling the operating pressure for actuating the supply valve operated by the distributor valve setting means, an operating lever controlling the supply of gas to the motor, a third valve operated by said lever controlling the operating pressure for actuating the supply valve, said second and third valves being in series so that the actuating pressure for operating the supply valve of the distributor valve series is dependent on both of said valves.

2. A fluid control mechanism as claimed in claim 1 further including fluid pressure means for closing said second valve, said means being operative in dependency on said third valve.

3. A fluid control mechanism as claimed in claim 1 wherein the supply valve controlling the admission of fluid pressure to said distributor valves is controlled by said third valve, and fluid pressure means for closing said second valve, said means being operative in dependency on said third valve.

4. A fluid control mechanism as claimed in claim 1 further including the feature that said third valve is closed in both its end positions and opens only momentarily while moving from one position to the other and vice versa.

5. A control device for pressure operated gear shifting mechanism in motor vehicles comprising a series of distributor valves controlling the distribution of pressure to the gear shifting mechanism for various gear selections, means for selectively setting said distributor valves for various gear selections, a source of fluid pressure, a valve controlling the supply of pressure from the source to the distributor valves, an operating lever controlling the supply of gas to the motor, pressure controlled actuating means for the supply valve, a valve controlled by the gas lever controlling the flow of pressure to said actuating means, said valve controlled by the gas lever having two closed end positions and being adapted to open only momentarily when being moved from one position to the other and vice versa, and a further valve controlling the flow of pressure to said actuating means actuatable by the distributor valve setting means.

6. A control device for pressure operated gear shifting mechanism in motor vehicles comprising a series of distributor valves controlling the distribution of pressure to the gear shifting mechanism for various gear selections, means for selectively setting said distributor valves for various gear selections, a source of fluid pressure, a valve controlling the supply of pressure from the source to the distributor valves, an operating lever controlling the supply of gas to the motor, pressure controlled actuating means for the supply valve, a valve controlled by the gas lever controlling the flow of pressure to said actuating means, said valve controlled by the gas lever having two closed end positions and being adapted to open only momentarily when being moved from one position to the other and vice versa, and a further valve controlling the flow of pressure to said actuating means actuatable by the distributor valve setting means in one direction, and fluid pressure means operating in dependency on the valve actuated by the gas lever for moving said further valve in the other direction.

7. In a control device for pressure-operated gear shifting mechanism in a motor vehicle, a series of distributor valves controlling the distribution of pressure to the gear shifting mechanism for various gear selections, means for selectively setting said distributor valves for various gear selections, a source of pressure, and control valve means operating in dependency on movement of the distributor valve setting means controlling the flow of pressure from said source to the distributor valves.

8. In a control device for pressure-operated gear shifting mechanism in a motor vehicle, a series of distributor valves controlling the distribution of pressure to the gear shifting mechanism for various gear selections, means for selectively setting said distributor valves for various gear selections, a lever controlling the supply of gas to the vehicle motor, a source of pressure, and control valve means operating in dependency on the distributor valve setting means and in dependency on the gas control lever controlling the flow of pressure from said source to the distributor valves.

9. In a control device for pressure-operated gear shifting mechanism in a motor vehicle, a series of distributor valves controlling the distribution of pressure to the gear shifting mechanism for various gear selections, means for selectively setting said distributor valves for various gear selections, a lever controlling the supply of gas to the vehicle motor, a source of pressure, control valve means controlling the flow of pressure from said source to the distributor valves, and actuating means controlled by the gas lever and by the distributor valve setting means for opening and closing said control valve means.

KARL MAYBACH.